(12) United States Patent
Hata et al.

(10) Patent No.: US 11,499,625 B2
(45) Date of Patent: Nov. 15, 2022

(54) COOLING SYSTEM FOR POWER TRANSMISSION UNIT

(71) Applicant: Toyota Jidosha Kabushiki Kaisha, Toyota (JP)

(72) Inventors: Kensei Hata, Shizuoka-ken (JP); Akiko Nishimine, Susono (JP); Shotaro Kato, Shizuoka-ken (JP); Masashi Shinoda, Shizuoka-ken (JP); So Okita, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 479 days.

(21) Appl. No.: 16/678,651

(22) Filed: Nov. 8, 2019

(65) Prior Publication Data

US 2020/0149624 A1 May 14, 2020

(30) Foreign Application Priority Data

Nov. 12, 2018 (JP) .............................. JP2018-212336

(51) Int. Cl.
*F16H 57/04* (2010.01)
*F16H 41/30* (2006.01)
(Continued)

(52) U.S. Cl.
CPC .......... *F16H 57/0435* (2013.01); *F01P 11/08* (2013.01); *F16H 41/30* (2013.01);
(Continued)

(58) Field of Classification Search
CPC .. F16H 57/0435; F16H 41/30; F16H 57/0423; F16H 57/0476; F16H 57/0441;
(Continued)

(56) References Cited

U.S. PATENT DOCUMENTS 6,450,275 B1* 9/2002 Gabriel .................... B60K 6/22
165/41
8,912,691 B2* 12/2014 Miyamoto .............. F16K 15/00
137/511
(Continued)

FOREIGN PATENT DOCUMENTS

CN 106208465 A 12/2016
CN 106838275 A 6/2017
(Continued)

*Primary Examiner* — Timothy Hannon
*Assistant Examiner* — Farhana Pervin
(74) *Attorney, Agent, or Firm* — Dinsmore & Shohl LLP (57) ABSTRACT

A cooling system for a power transmission unit that can supply oil properly to a differential mechanism and motors. The cooling system comprises: a first branch passage to supply the oil to the differential mechanism; a second branch passage to supply the oil to the first motor; and a third branch passage to supply the oil to the second motor. The second branch passage includes a first oil feeding section that supplies the oil to a coil of the first motor, and a second oil feeding section that supplies the oil f to a core of the first motor. The third branch passage includes a third oil feeding section that supplies the oil to a coil of the second motor, and a fourth oil feeding section that supplies the oil to a core of the second motor.

15 Claims, 5 Drawing Sheets

(51) Int. Cl.
*F01P 11/08* (2006.01)
*H02K 7/116* (2006.01)

(52) U.S. Cl.
CPC ..... *F16H 57/0423* (2013.01); *F16H 57/0476* (2013.01); *H02K 7/116* (2013.01)

(58) Field of Classification Search
CPC ............. F16H 57/0456; F16H 57/0413; F16H 57/0404; F16H 57/0417; F16H 57/042; F16H 57/0436; F16H 57/045; F16H 57/0482; F01P 11/08; H02K 7/116; H02K 1/32; H02K 9/19; H02K 7/006; B60K 6/405; B60K 6/445
See application file for complete search history.

(56) References Cited

U.S. PATENT DOCUMENTS

| | | | | |
|---|---|---|---|---|
| 9,762,106 | B2* | 9/2017 | Gauthier | H02K 9/19 |
| 2010/0120569 | A1* | 5/2010 | Sanji | B60L 50/16 |
| | | | | 475/5 |
| 2014/0158467 | A1* | 6/2014 | Kimura | F01M 11/10 |
| | | | | 184/6 |
| 2014/0174856 | A1* | 6/2014 | Takagi | B60K 6/445 |
| | | | | 184/6.12 |
| 2016/0069428 | A1* | 3/2016 | Takayanagi | B60K 6/383 |
| | | | | 903/910 |
| 2016/0099633 | A1* | 4/2016 | Yoshinori | H02K 1/32 |
| | | | | 310/53 |
| 2017/0097086 | A1 | 4/2017 | Ono et al. | |
| 2018/0045295 | A1 | 2/2018 | Kiyokami et al. | |
| 2019/0305643 | A1 | 10/2019 | Huber et al. | |

FOREIGN PATENT DOCUMENTS

| | | | |
|---|---|---|---|
| DE | 102017201117 A1 | | 7/2018 |
| JP | 2009-023426 | | 2/2009 |
| JP | 2012106599 A | * | 6/2012 |
| JP | 2013-177030 A | | 9/2013 |
| JP | 2016-73163 A | | 5/2016 |
| JP | 2017-67258 A | | 4/2017 |
| WO | 2018137955 A1 | | 8/2018 |

* cited by examiner

COOLING SYSTEM FOR POWER TRANSMISSION UNIT

CROSS REFERENCE TO RELATED APPLICATIONS

The present application claims the benefit of priority to Japanese Patent Application No. 2018-212336 filed on Nov. 12, 2018 with the Japanese Patent Office.

BACKGROUND

Field of the Disclosure

Embodiments of the present disclosure relate to the art of a cooling system for a power transmission unit that transmits an engine torque to drive wheels, and more especially, to a cooling system that cools a power transmission unit including an engine and a motor-generator by oil.

Discussion of the Related Art

US 2010/0120569 A1 describes one example of the cooling system for the power transmission device of this kind. In a driving apparatus taught by US 2010/0120569 A1, a prime mover includes an engine, a first motor-generator, and a second motor-generator, and a differential gear mechanism is arranged in the driving apparatus to distribute a power of the engine to the first motor-generator and to an output gear. A torque of the second motor-generator is synthesized with a torque delivered from an output gear to drive wheels. According to the teachings US 2010/0120569 A1, an oil pump is driven by the torque of the engine, and the differential gear mechanism is cooled and lubricated by an oil supplied from the oil pump through an oil passage formed in an input shaft of the differential gear mechanism.

As a result of energizing the conventional motor-generator, the motor-generator may be heated by Joule heat and fractional heat resulting from a rotation of a rotor. Therefore, it is necessary to cool the motor-generator by oil. However, an amount of heat generation in the motor-generator is different from an amount of heat generation in the differential gear mechanism. That is, a required amount of the oil for cooling the motor-generator is different from a required amount of the oil for cooling the differential gear mechanism. In order to cool both of the motor-generator and the differential gear mechanism properly by supplying ample amount of the oil to the motor-generator and the differential gear mechanism, the conventional cooling systems have to be improved.

SUMMARY

Aspects of the present disclosure have been conceived noting the foregoing technical problems, and it is therefore an object of the present disclosure to provide a cooling system for a power transmission unit that can supply oil properly to a differential mechanism and a motor.

The cooling system according to the embodiment of the present disclosure is applied to a power transmission unit, comprising: an engine; a first motor having a generating function; a differential mechanism that distributes a torque of the engine to the first motor and drive wheels; and a second motor that is driven by an electric power generated by the first motor to generate a torque to be synthesized with a torque transmitted from the differential mechanism to the drive wheels. The cooling system comprise: an oil pump that pumps up an oil from an oil pan, and that supplies the oil to the first motor, the second motor, and the differential mechanism; an oil cooler that cools the oil; and a cyclic oil passage that connects the oil pump and the oil cooler to circulate the oil between the oil pump and the oil cooler. In order to achieve the above-explained objective, according to the embodiment of the present disclosure, the cooling system comprise is provided with: a first branch passage that is branched from the cyclic oil passage to supply the oil to the differential mechanism; a second branch passage that is branched from the cyclic oil passage at downstream of the first branch passage to supply the oil to the first motor; and a third branch passage that is branched from the cyclic oil passage in parallel to the second branch passage, at downstream of the first branch passage to supply the oil to the second motor. The second branch passage includes a first oil feeding section that supplies the oil flowing through the second branch passage to a coil of the first motor at least partially, and a second oil feeding section that supplies the remaining oil flowing through the second branch passage to a core of the first motor. The third branch passage includes a third oil feeding section that supplies the oil flowing through the third branch passage to a coil of the second motor at least partially, and a fourth oil feeding section that supplies the remaining oil flowing through the third branch passage to a core of the second motor.

In a non-limiting embodiment, the second oil feeding section may be formed downstream of the first oil feeding section, and the fourth oil feeding section may be formed downstream of the third oil feeding section.

In a non-limiting embodiment, the power transmission unit may further comprise a case that holds the first motor and the second motor. The first oil feeding section may be situated above the first motor in the case, and the third oil feeding section may be situated above the second motor in the case. The second branch passage may further include a first intermediate section extending outside of the case between the first oil feeding section and the second oil feeding section, and the third branch passage may further include a second intermediate section extending outside of the case between the third oil feeding section and the fourth oil feeding section.

In a non-limiting embodiment, the first branch passage may be branched from the cyclic oil passage upstream of the oil cooler, and the second branch passage and the third branch passage may be branched from the cyclic oil passage downstream of the oil cooler.

In a non-limiting embodiment, the cooling system may further comprise an orifice that is arranged on the first branch passage.

Thus, according to the exemplary embodiment of the present disclosure, the oil discharged from the oil pump circulate within the cyclic oil passage is partially delivered to the differential mechanism through the first branch passage branched from the cyclic oil passage. The remaining oil in the cyclic oil passage is delivered to the first motor through the second branch passage and to the third motor through the third branch passage branched from the cyclic oil passage downstream of the first branch passage respectively. However, an orifice or the like is not arranged on the cyclic oil passage. For this reason, an energy loss of the oil pump derived from an increase in a pressure loss in the cyclic oil passage can be reduced with a simple structure. In addition, since each of the branch passages are branched from the cyclic oil passage toward the differential mechanism, the first motor, and the second motor respectively, the oil may be delivered to the differential mechanism, the first motor, and the second motor in appropriate amounts. Moreover, since the oil cooled by the oil cooler is delivered to the first motor and the second motor, the first motor and the second motor may be cooled efficiently. Further, since the second branch passage and the third branch passage are formed in parallel, a pressure loss in the cyclic oil passage will not be increased compared to a case in which the second branch passage and the third branch passage are formed in series. Furthermore, the second branch passage comprises the first oil feeding section for feeding the oil to the coil of the first motor, and the second oil feeding section for feeding the oil to the core of the first motor. Likewise, the third branch passage comprises the third oil feeding section for feeding the oil to the coil of the second motor, and the fourth oil feeding section for feeding the oil to the core of the second motor. For this reason, amounts of the oil to be supplied to the coil and the core of each motor may be differentiated to cool the motor efficiently.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION

Figure 1:
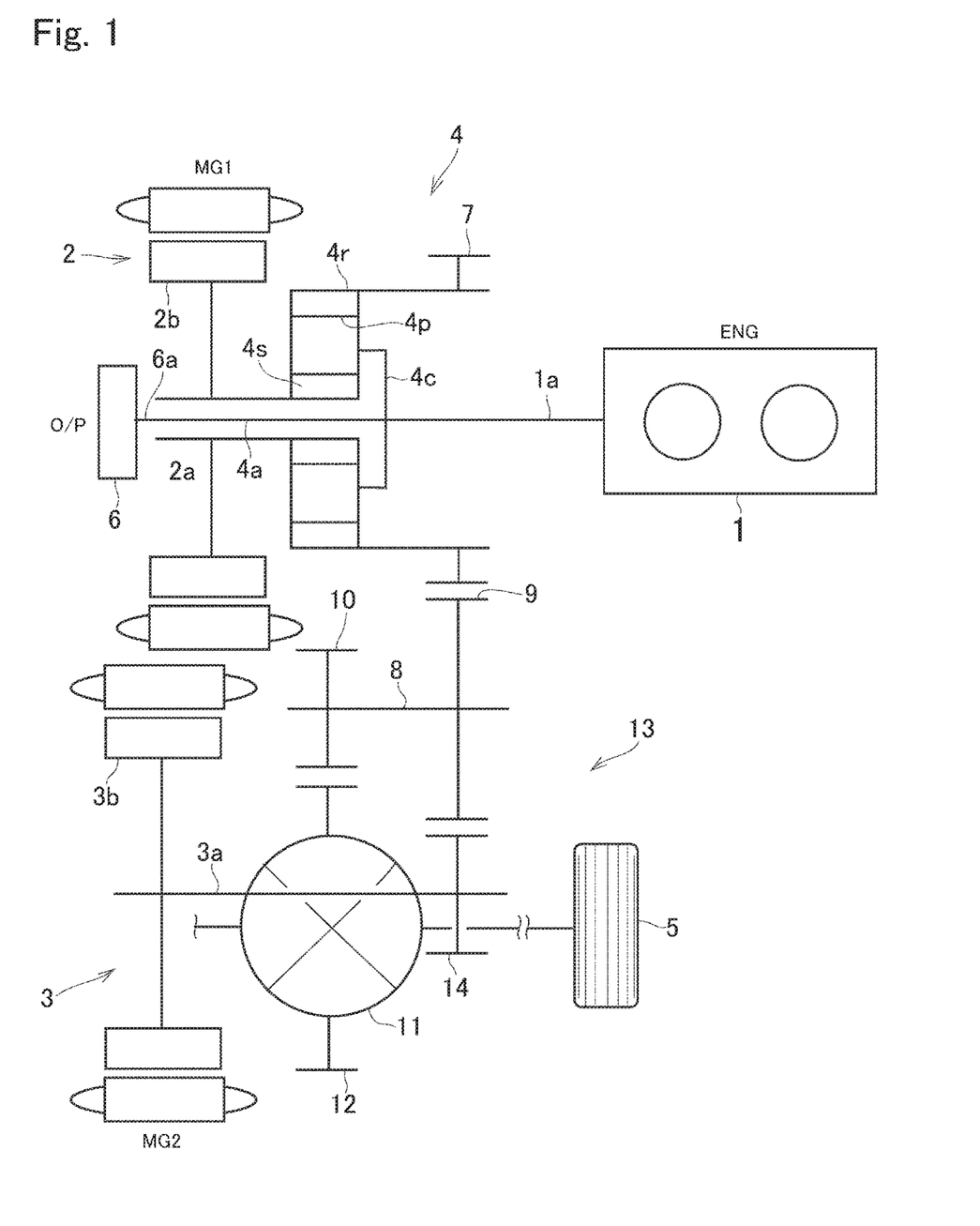
FIG. 1 is a schematic illustration showing one example of the power transmission unit of a vehicle to which the cooling system according to the exemplary embodiment of the present disclosure is applied.

Referring now to FIG. 1, there is shown one example of a power transmission unit of a hybrid vehicle (as will be simply called the "vehicle" hereinafter) to which the cooling system according to the exemplary embodiment of the present disclosure is applied. A prime mover of the vehicle comprises an engine (referred to as ENG in FIG. 1) 1, a first motor (referred to as MG1 in FIG. 1) 2, and a second motor (referred to as MG2 in FIG. 1) 3. In the vehicle, an output power of the engine 1 is distributed to the first motor 2 and drive wheels 5 through a power split mechanism 4 as a differential mechanism. An electric power generated by the first motor 2 may be supplied to the second motor 3 to operate the second motor 3 as a motor, and torque generated by the second motor 3 may be delivered to the drive wheels 5.

Each of the first motor 2 and the second motor 3 is a motor-generator that is operated not only as a motor to generate torque by applying electricity thereto, but also as a generator to generate electricity by applying torque thereto. For example, a permanent magnet synchronous motor and an AC motor such as an induction motor may be used as the first motor 2 and the second motor 3, respectively.

In the example shown in FIG. 1, a single-pinion planetary gear unit is employed as the power split mechanism 4. Specifically, the power split mechanism 4 comprises a sun gear 4s, a ring gear 4r as an internal gear that is arranged concentrically with the sun gear 4s, a plurality of planetary gears 4p interposed between the sun gear 4s and the ring gear 4r, and a carrier 4c supporting the planetary gears 4p in a rotatable manner.

The first motor 2 is disposed between the oil pump 6 and the power split mechanism 4, and the carrier 4c of the power split mechanism 4 is mounted on an output shaft 1a of the engine 1. In the first motor 2, a hollow rotary shaft 2a that is rotated integrally with a rotor 2b is connected to a hollow rotary shaft of the sun gear 4s of the power split mechanism 4. A rotary shaft 6a of the oil pump 6 penetrates through the rotary shaft 2a and the sun gear 4s to be connected to an input shaft 4a of the power split mechanism 4.

A first drive gear 7 as an external gear is integrally formed around the ring gear 4r of the power split mechanism 4, and a countershaft 8 is arranged in parallel with a common rotational axis of the power split mechanism 4 and the first motor 2. A counter driven gear 9 is fitted onto one end of the countershaft 8 (i.e., right side in FIG. 1) to be rotated integrally therewith while being meshed with the first drive gear 7, and a counter drive gear 10 is fitted onto the other end of the countershaft 8 (i.e., left side in FIG. 1) to be rotated integrally therewith while being meshed with a differential ring gear 12 of a differential gear unit 11 as a final reduction. Thus, the ring gear 4r of the power split mechanism 4 is connected to the drive wheel 5 through an output gear train 13 including the first drive gear 7, the countershaft 8, the counter driven gear 9, the counter drive gear 10, and the differential ring gear 12.

In the power transmission unit of the vehicle, an output torque of the second motor 3 can be added to the torque delivered from the power split mechanism 4 to the drive wheels 5. To this end, a rotary shaft 3a of the second motor 3 extends in parallel with the countershaft 8, and a second drive gear 14 is fitted onto a leading end of the rotary shaft 3a to be rotated integrally therewith while being meshed with the counter driven gear 9. The second drive gear 14 is diametrically larger than the counter driven gear 9 so that the output torque of the second motor 3 is multiplied by the second drive gear 14. That is, the output gear train 13 serves as a speed reducing section in which the counter driven gear 9 and the second drive gear 14 serve as a speed reducing mechanism.

Figure 2:
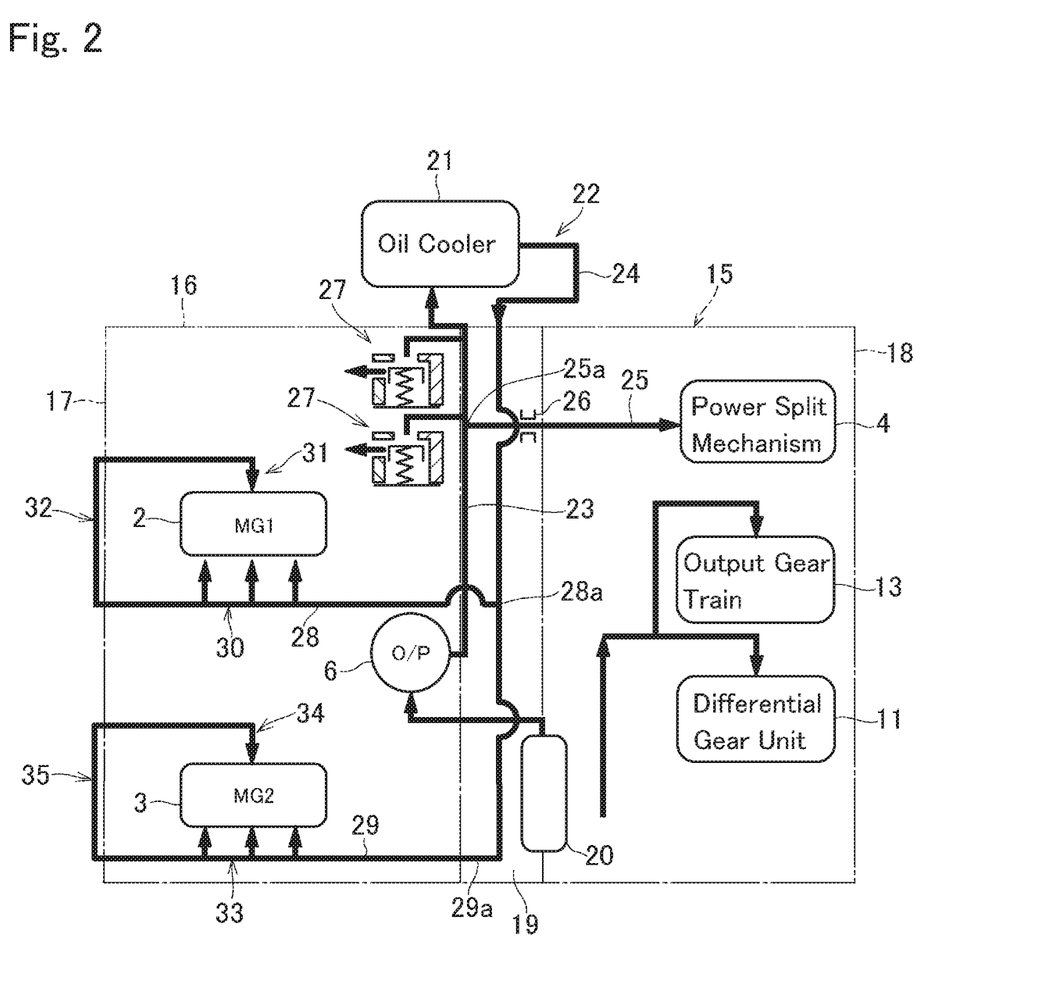
FIG. 2 is a circuit diagram showing one example of a structure of oil passages for supplying oil to a power split mechanism etc.

Next, an oil feeding system for supplying oil to the power split mechanism 4 and the motors 2 and 3 will be explained with reference to FIG. 2. As illustrated in FIG. 2, the power transmission unit is held in a transmission case 15. The transmission case 15 includes a motor case 16, an end cover 17, and a gear case 18. Specifically, the motor case 16 is a cylindrical case, and the first motor 2 and the second motor 3 are held in the motor case 16. One of openings of the motor case 16 is closed by the end cover 17.

The gear case 18 also as a cylindrical case is arranged in an opposite side to the end cover 17 across the motor case 16, and the power split mechanism 4, the differential gear unit 11, the output gear train 13 etc. are held in the gear case 18. The motor case 16 and the gear case 18 are joined to each other through a center support 19. The rotary shaft 2a of the first motor 2 and the rotary shaft 3a of the second motor 3 penetrate through the center support 19 while being supported in a rotatable manner by bearings (not shown) respectively. In the transmission case 15, accordingly, an internal space enclosed by the motor case 16, the end cover 17, and the center support 19 serves as a motor chamber, and an internal space enclosed by the gear case 18 and the center support 19 serves as a gear chamber.

In order to cool and lubricate the first motor 2, the second motor 3, the power split mechanism 4 and so on, the oil is circulated in the transmission case 15. An oil pan (not shown) is formed on a bottom of the transmission case 15, and the differential ring gear 12 is immersed at least partially in the oil held in the oil pan. When the differential ring gear 12 is rotated by torque, the oil held in the oil pan is splashed by the differential ring gear 12 to be applied to the differential gear unit 11, the output gear train 13 and so on.

The oil applied to the differential gear unit 11, the output gear train 13 and so on drips to the oil pan, and pumped up by the oil pump 6 to an oil cooler 21 through a strainer 20. The oil cooled by the oil cooler 21 is returned to the oil pan again. To this end, a cyclic oil passage 22 is formed between the oil pan and the oil cooler 21. Specifically, an outlet (not shown) of the oil pump 6 is connected to the oil cooler 21 through a first oil passage 23, and the oil cooled by the oil cooler 21 is returned to the oil pan through a second oil passage 24. As illustrated in FIG. 2, the first oil passage 23 and the second oil passage 24 are formed in the center support 19. For example, a conventional water-cooling system may be adopted as the oil cooler 21, and the oil cooler 21 cools the oil by exchanging heat between the oil and water. Heat of the water that is warmed as a result of such heat exchange between the oil and the water is radiated to the external atmosphere through a radiator (not shown).

The first oil passage 23 is branched into a first branch passage 25 upstream of the oil cooler 21 at a branching point 25a. Specifically, the first branch passage 25 is formed mainly of a pipe, and oriented to the power split mechanism 4. In order to reduce a flow rate of the oil flowing through the first branch passage 25, an orifice 26 is arranged on the first branch passage 25. That is, a flow rate of the oil flowing through the first oil passage 23 is larger than a flow rate of the oil flowing through the first branch passage 25.

A plurality of relief valves 27 are arranged downstream of the branching point 25a of the first branch passage 25 on the first oil passage 23. According to the example shown in FIG. 2, specifically, two relief valves 27 are arranged in parallel on the first oil passage 23. Each of the relief valves 27 is opened when a hydraulic pressure in the cyclic oil passage 22 is raised to a predetermined level thereby discharging the oil from the cyclic oil passage 22 to the oil pan. Consequently, an internal pressure of the cyclic oil passage 22 is reduced lower than the predetermined level.

The second oil passage 24 is branched into a second branch passage 28 to supply the oil to the first motor 2, and a third branch passage 29 to supply the oil to the second motor 3. The second branch passage 28 and the third branch passage 29 are also formed mainly of a pipe, respectively, and branched from the second oil passage 24 in parallel to each other. Specifically, the second branch passage 28 is branched from the second oil passage 24 at a branching point 28a that is downstream of the branching point 25a of the first branch passage 25. The second branch passage 28 comprises: a first upper outlet section 30 as a first oil feeding section that supplies the oil to a coil 2c of the first motor 2 from above; a first core cooling section 31 as a second oil feeding section that supplies the oil to a core of the first motor 2 from inside; and a first intermediate section 32 extending between the first upper outlet section 30 and the first core cooling section 31.

Figure 3:
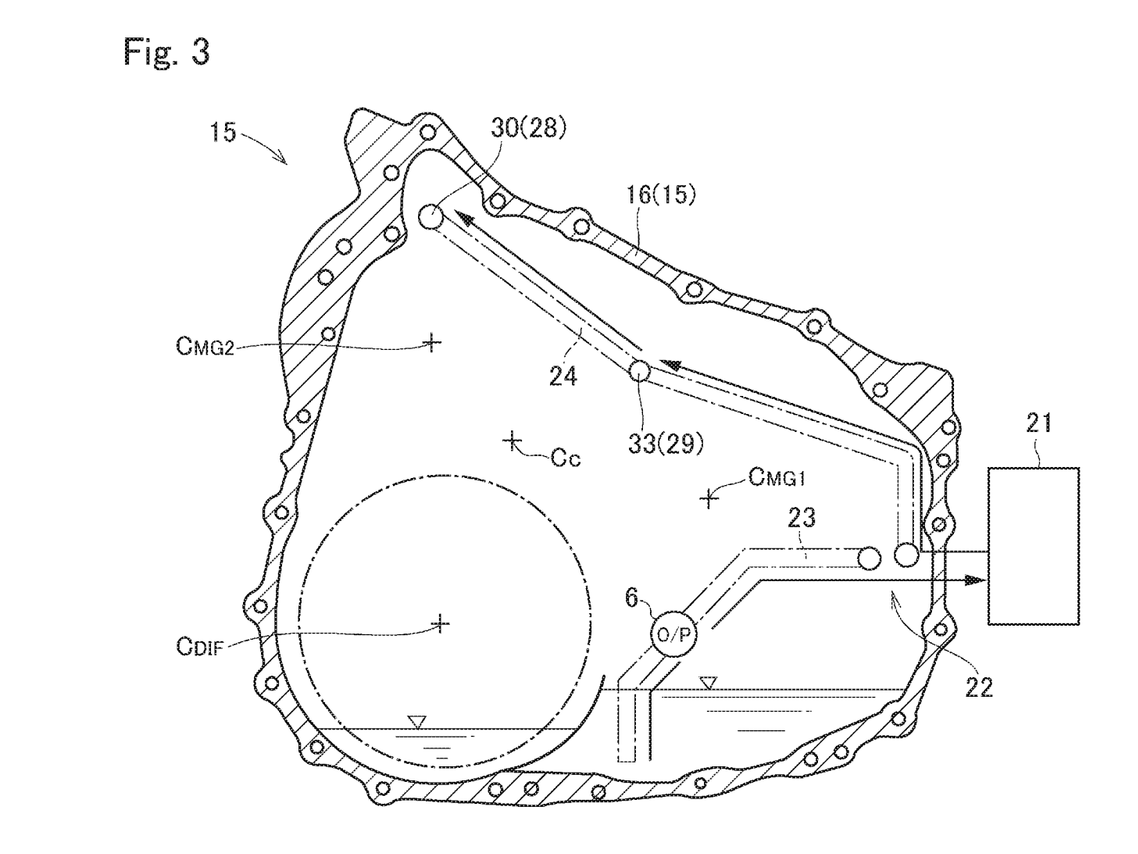
FIG. 3 is a partial cross-sectional view showing a part of a cross-section of the power transmission unit.
Figure 4:
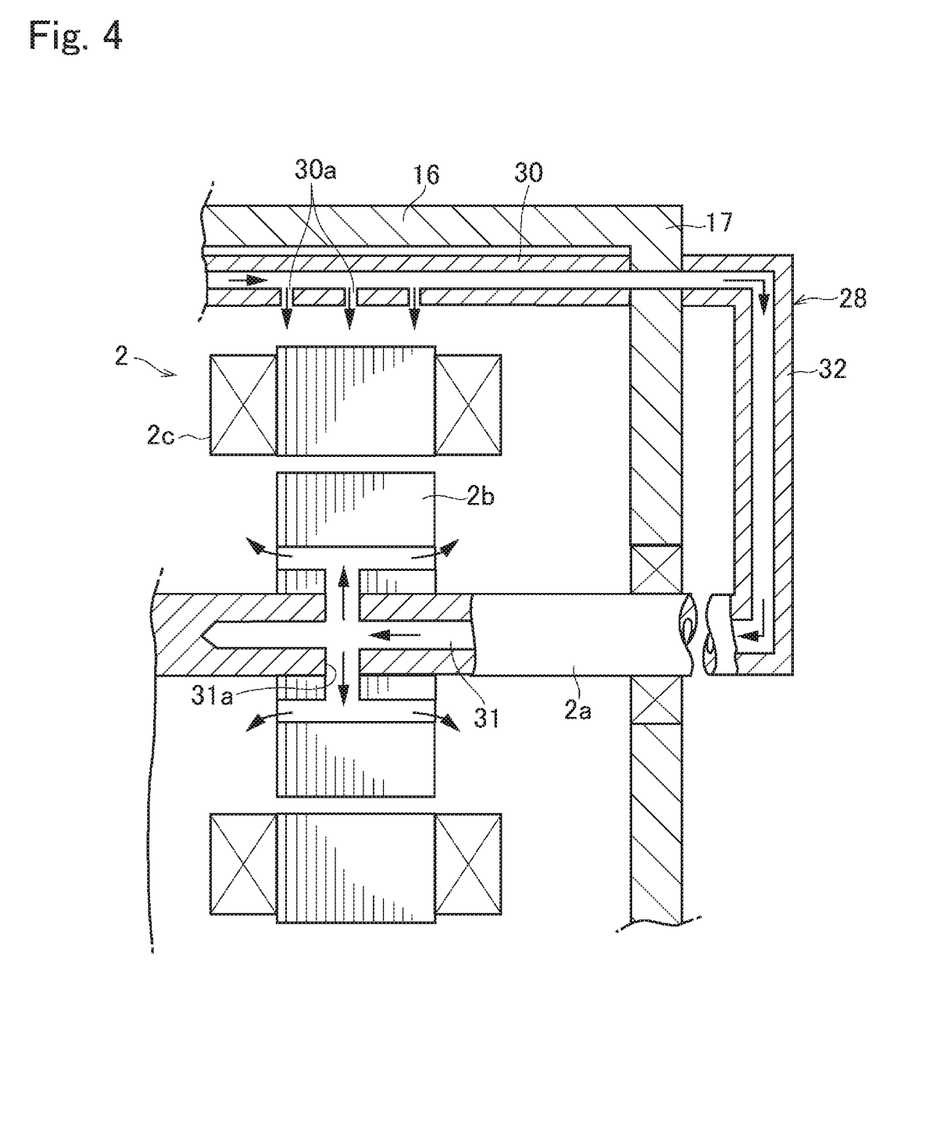
FIG. 4 is a partial cross-sectional view showing a part of a cross-section of the oil passage for supplying the oil to the first motor in an enlarged scale.

The first upper outlet section 30 extends substantially parallel to a center axis $C_{MG1}$ of the first motor 2. In order to supply the oil to the coil 2c of the first motor 2 from above, as shown in FIG. 3, the first upper outlet section 30 is situated above the first motor 2 in the motor case 16. FIG. 4 shows a structure of the first upper outlet section 30 in more detail in an enlarged scale. As illustrated in FIG. 4, a plurality of outlet holes 30a are formed in the first upper outlet section 30 in such a manner as to penetrate through the pipe forming the first upper outlet section 30 in a thickness direction. As indicated by the arrows in FIG. 3, the oil flowing through the first upper outlet section 30 drips from the outlet holes 30a to the coil 2c of the first motor 2 thereby drawing the heat of the coil 2c of the first motor 2. Then, the oil further drips from the coil 2c of the first motor 2 to the oil pan, and pumped up again by the oil pump 6 to the oil cooler 21 to be cooled again. In FIG. 3, only the center axis $C_{MG1}$ of the first motor 2, a center axis $C_{MG2}$ of the second motor 3, a center axis $C_C$ of the countershaft 8, and a center axis $C_{DTF}$ of the differential gear unit 11 are indicated for the sake of illustration.

As illustrated in FIGS. 2 and 4, the first intermediate section 32 of the second branch passage 28 extends outside of the end cover 17 between the first upper outlet section 30 and the first core cooling section 31. Specifically, one end of the first upper outlet section 30 is attached to an inner surface of the end cover 17 around a through hole formed on the end cover 17, and one end of the first intermediate section 32 is attached to an outer surface of the end cover 17 around the through hole, so that the first upper outlet section 30 and the first intermediate section 32 are joined to each other through the through hole. On the other hand, one end of the first core cooling section 31 is joined to the other end of the first intermediate section 32 in a liquid-tight manner.

As illustrated in FIG. 4, the first core cooling section 31 is formed in the rotary shaft 2a of the first motor 2. In order to supply the oil to the rotor 2b of the first motor 2 from inside, an outlet hole 31a is formed in the first core cooling section 31 to penetrate through the rotary shaft 2a in a thickness direction. Thus, in the second branch passage 28, the first upper outlet section 30 and the first core cooling section 31 are formed in series. Therefore, a pressure loss in the second branch passage 28 is governed by an inner diameter and a length of the second branch passage 28, a total opening area of the outlet hole(s) 30a and the outlet hole 31a, and so on. That is, the pressure loss in the second branch passage 28 may be adjusted by changing diameters and number of the outlet hole 30a and the outlet hole 31a.

As illustrated in FIG. 2, the third branch passage 29 is branched from the second oil passage 24 at a branching point 29a that is downstream of the branching point 28a of the second branch passage 28. The third branch passage 29 comprises: a second upper outlet section 33 as a third oil feeding section that supplies the oil to a coil 3c of the second motor 3 from above; a second core cooling section 34 as a fourth oil feeding section that supplies the oil to a core of the second motor 3 from inside; and a second intermediate section 35 extending between the second upper outlet section 33 and the second core cooling section 34.

Figure 5:
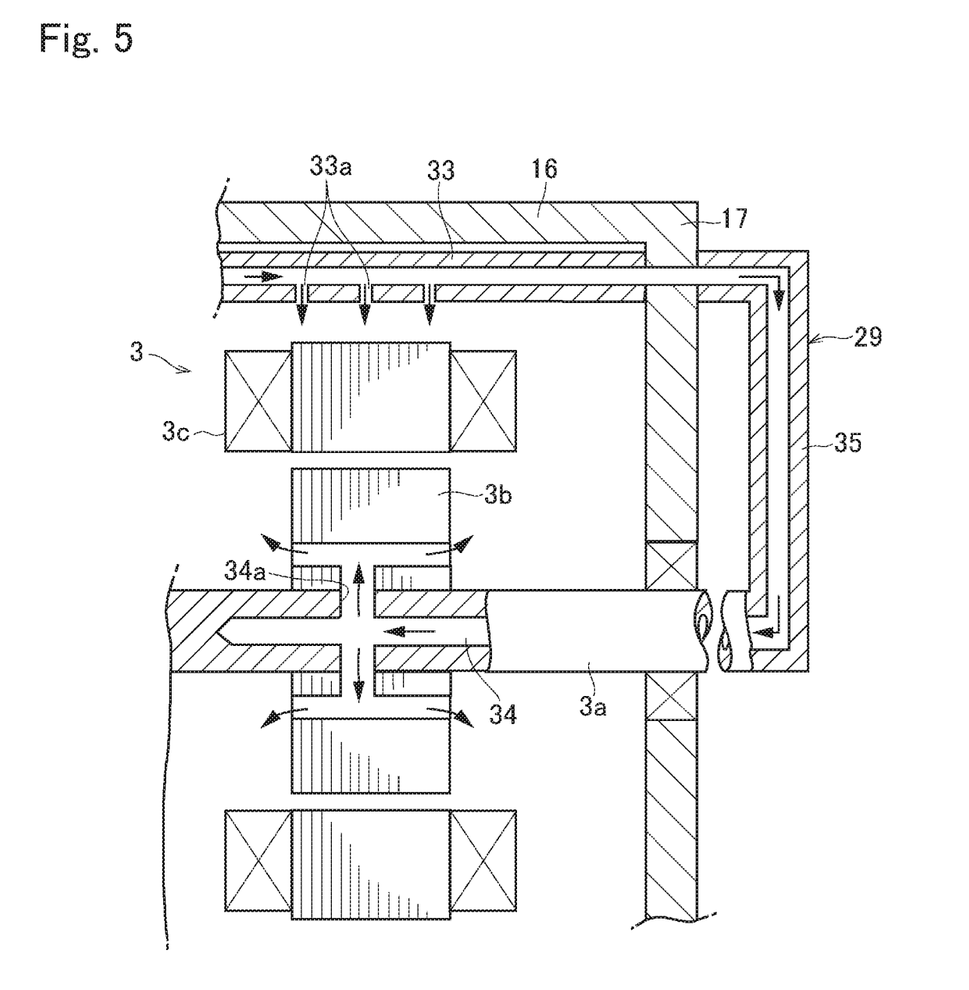
FIG. 5 is a partial cross-sectional view showing a part of a cross-section of the oil passage for supplying the oil to the second motor in an enlarged scale.

The second upper outlet section 33 extends substantially parallel to a center axis of the second motor 3. In order to supply the oil to the coil 3c of the second motor 3 from above, the second upper outlet section 33 is situated above the second motor 3 in the motor case 16. FIG. 5 shows a structure of the second upper outlet section 33 in more detail in an enlarged scale. As illustrated in FIG. 5, a plurality of outlet holes 33a are formed in the second upper outlet section 33 in such a manner as to penetrate through the pipe forming the second upper outlet section 33 in a thickness direction. The oil flowing through the second upper outlet section 33 drips from the outlet holes 33a to the coil 3c of the second motor 3 thereby drawing the heat of the coil 3c of the second motor 3. Then, the oil further drips from the coil 3c of the second motor 3 to the oil pan, and pumped up again by the oil pump 6 to the oil cooler 21 to be cooled again.

As illustrated in FIGS. 2 and 5, the second intermediate section 35 of the third branch passage 29 extends outside of the end cover 17 between the second upper outlet section 33 and the second core cooling section 34. Specifically, one end of the second upper outlet section 33 is attached to the inner surface of the end cover 17 around another through hole formed on the end cover 17, and one end of the second intermediate section 35 is attached to the outer surface of the end cover 17 around another through hole, so that the second upper outlet section 33 and the second intermediate section 35 are joined to each other through another through hole. On the other hand, one end of the second core cooling section 34 is joined to the other end of the second intermediate section 35 in a liquid-tight manner.

As illustrated in FIG. 5, the second core cooling section 34 is formed in the rotary shaft 3a of the second motor 3. In order to supply the oil to a rotor 3b of the second motor 3 from inside, an outlet hole 34a is formed in the second core cooling section 34 to penetrate through the rotary shaft 3a in a thickness direction. Thus, in the third branch passage 29, the second upper outlet section 33 and the second core cooling section 34 are formed in series. Therefore, a pressure loss in the third branch passage 29 is governed by an inner diameter and a length of the third branch passage 29, a total opening area of the outlet hole(s) 33a and the outlet hole 34a, and so on. That is, the pressure loss in the third branch passage 29 may be adjusted by changing diameters and number of the outlet hole 33a and the outlet hole 34a.

In the cooling system according to the embodiment of the present disclosure, the oil discharged from the oil pump 6 is delivered to the oil cooler 21 through the first oil passage 23. In this situation, the oil flowing through the first oil passage 23 is partially supplied to the power split mechanism 4. As described, since the orifice 26 is arranged on the first branch passage 25, an appropriate amount of the oil is supplied to the power split mechanism 4. The oil supplied to the power split mechanism 4 drips to the oil pan.

Heat of the oil delivered to the oil cooler 21 through the first oil passage 23 is drawn by the cooling water. Then, the oil thus cooled by the oil cooler 21 is delivered to the second oil passage 24, and distributed to the first motor 2 through the second branch passage 28 and to the second motor 3 through the third branch passage 29. Thus, the oil circulating through the cyclic oil passage 22 is partially delivered to the power split mechanism 4, and the remaining oil is distributed to the first motor 2 and the second motor 3. However, a flow control valve, an orifice or the like is not arranged on the cyclic oil passage 22. For this reason, an energy loss of the oil pump 6 derived from an increase in a pressure loss in the cyclic oil passage 22 can be reduced with a simple structure. In addition, since the second branch passage 28 and the third branch passage 29 are formed in parallel, the pressure loss in the cyclic oil passage 22 will not be increased compared to a case in which the second branch passage 28 and the third branch passage 29 are formed in series. Whereas, the first upper outlet section 30 and the first core cooling section 31 are formed in series in the second branch passage 28, and the second upper outlet section 33 and the second core cooling section 34 formed in series in the third branch passage 29. For this reason, feeding amounts of the oil to the first motor 2 and the second motor 3, and pressure losses in the second branch passage 28 and the third branch passage 29 may be adjusted by changing diameters and number of the outlet hole 30a and the outlet hole 33a. According to the embodiment of the present disclosure, therefore, the oil can be supplied to the power split mechanism 4, the first motor 2, and the second motor 3 in appropriate amounts. Further, since the oil cooled by the oil cooler 21 is delivered to the first motor 2 and the second motor 3, the first motor 2 and the second motor 3 may be cooled efficiently. Furthermore, since the second branch passage 28 and the third branch passage 29 are individually formed mainly of the pipe material, design flexibility of the second branch passage 28 and the third branch passage 29 can be increased.

Although the above exemplary embodiments of the present disclosure have been described, it will be understood by those skilled in the art that the present disclosure should not be limited to the described exemplary embodiments, and various changes and modifications can be made within the scope of the present disclosure. For example, not only a mechanical pump but also an electric oil pump may be adopted as the oil pump 6.

What is claimed is:

1. A cooling system for a power transmission unit, comprising:
an engine;
a first motor having a generating function;
a differential mechanism that distributes a torque of the engine to the first motor and drive wheels; and
a second motor that is driven by an electric power generated by the first motor to generate a torque to be synthesized with a torque transmitted from the differential mechanism to the drive wheels,
the cooling system comprising:
an oil pump that pumps up an oil from an oil pan, and that supplies the oil to the first motor, the second motor, and the differential mechanism;
an oil cooler that cools the oil;
a cyclic oil passage that connects the oil pump and the oil cooler to circulate the oil between the oil pump and the oil cooler,
a first branch passage that is branched from the cyclic oil passage to supply the oil to the differential mechanism;
a second branch passage that is branched from the cyclic oil passage at downstream of the first branch passage to supply the oil to the first motor; and
a third branch passage that is branched from the cyclic oil passage in parallel to the second branch passage, at downstream of the first branch passage to supply the oil to the second motor,
wherein the second branch passage includes a first oil feeding section that supplies the oil flowing through the second branch passage to a coil of the first motor at least partially, and a second oil feeding section that supplies the remaining oil flowing through the second branch passage to a core of the first motor, and
the third branch passage includes a third oil feeding section that supplies the oil flowing through the third branch passage to a coil of the second motor at least partially, and a fourth oil feeding section that supplies the remaining oil flowing through the third branch passage to a core of the second motor; and
wherein the second oil feeding section is formed downstream of the first oil feeding section, and
the fourth oil feeding section is formed downstream of the third oil feeding section.

2. The cooling system for the power transmission unit as claimed in claim 1,
wherein the power transmission unit further comprises a case that holds the first motor and the second motor,
the first oil feeding section is situated above the first motor in the case,
the third oil feeding section is situated above the second motor in the case,
the second branch passage further includes a first intermediate section extending outside of the case between the first oil feeding section and the second oil feeding section, and
the third branch passage further includes a second intermediate section extending outside of the case between the third oil feeding section and the fourth oil feeding section.

3. The cooling system for the power transmission unit as claimed in claim 2,
wherein the first branch passage is branched from the cyclic oil passage upstream of the oil cooler, and
the second branch passage and the third branch passage are branched from the cyclic oil passage downstream of the oil cooler.

4. The cooling system for the power transmission unit as claimed in claim 3, further comprising:
an orifice that is arranged on the first branch passage.

5. The cooling system for the power transmission unit as claimed in claim 2, further comprising:
an orifice that is arranged on the first branch passage.

6. The cooling system for the power transmission unit as claimed in claim 1,
wherein the power transmission unit further comprises a case that holds the first motor and the second motor,
the first oil feeding section is situated above the first motor in the case,
the third oil feeding section is situated above the second motor in the case,
the second branch passage further includes a first intermediate section extending outside of the case between the first oil feeding section and the second oil feeding section, and
the third branch passage further includes a second intermediate section extending outside of the case between the third oil feeding section and the fourth oil feeding section.

7. The cooling system for the power transmission unit as claimed in claim 6,
wherein the first branch passage is branched from the cyclic oil passage upstream of the oil cooler, and
the second branch passage and the third branch passage are branched from the cyclic oil passage downstream of the oil cooler.

8. The cooling system for the power transmission unit as claimed in claim 7, further comprising:
an orifice that is arranged on the first branch passage.

9. The cooling system for the power transmission unit as claimed in claim 6, further comprising:
an orifice that is arranged on the first branch passage.

10. The cooling system for the power transmission unit as claimed in claim 1,
wherein the first branch passage is branched from the cyclic oil passage upstream of the oil cooler, and
the second branch passage and the third branch passage are branched from the cyclic oil passage downstream of the oil cooler.

11. The cooling system for the power transmission unit as claimed in claim 10, further comprising:
an orifice that is arranged on the first branch passage.

12. The cooling system for the power transmission unit as claimed in claim 1,
wherein the first branch passage is branched from the cyclic oil passage upstream of the oil cooler, and
the second branch passage and the third branch passage are branched from the cyclic oil passage downstream of the oil cooler.

13. The cooling system for the power transmission unit as claimed in claim 12, further comprising:
an orifice that is arranged on the first branch passage.

14. The cooling system for the power transmission unit as claimed in claim 1, further comprising:
an orifice that is arranged on the first branch passage.

15. The cooling system for the power transmission unit as claimed in claim 1, further comprising:
an orifice that is arranged on the first branch passage.

* * * * *